Figure 1:
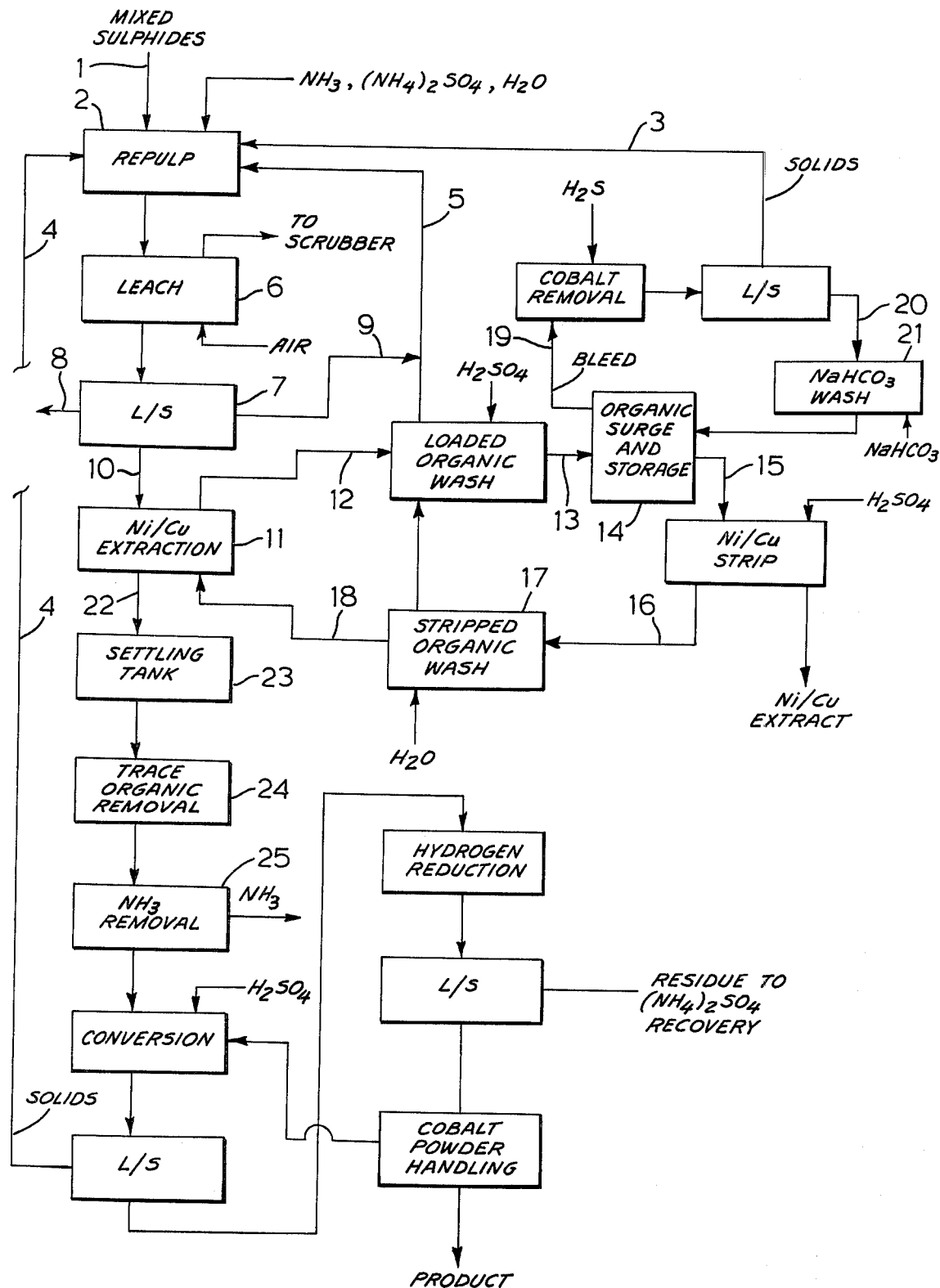

United States Patent [19]

Wallace et al.

[11] 4,108,640

[45] Aug. 22, 1978

[54] HYDROMETALLURGICAL PROCESS FOR THE PRODUCTION OF COBALT POWDER FROM MIXED METAL SULPHIDES

[75] Inventors: Herbert F. Wallace, Sherwood Park; Donald R. Weir, Fort Saskatchewan, both of Canada

[73] Assignee: Sherritt Gordon Mines Limited, Toronto, Canada

[21] Appl. No.: 713,325

[22] Filed: Aug. 11, 1976

[30] Foreign Application Priority Data

Aug. 25, 1975 [CA] Canada .................................. 234319

[51] Int. Cl.² ............................................. C22B 23/04
[52] U.S. Cl. .................................. 75/103; 75/0.5 AA; 75/101 BE; 75/119; 423/139; 423/145
[58] Field of Search .................... 75/119, 101 BE, 103, 75/0.5 AA; 423/139, 145

[56] References Cited

U.S. PATENT DOCUMENTS

| | | | |
|---|---|---|---|
| 3,276,863 | 10/1966 | Drobnick et al. ................. | 75/119 X |
| 3,775,098 | 11/1973 | Kunda et al. .......................... | 75/108 |
| 3,816,098 | 6/1974 | Mackiw et al. ..................... | 75/103 X |
| 3,907,966 | 9/1975 | Skarbo ................................. | 423/139 |
| 3,923,615 | 12/1975 | Kane et al. ........................ | 75/117 X |
| 3,950,487 | 4/1976 | Pemsler et al. .................. | 423/139 X |
| 3,975,190 | 8/1976 | Van der Meulen et al. ...... | 75/101 R |
| 3,988,151 | 10/1976 | Skarbo et al. ........................... | 75/119 |

*Primary Examiner*—G. Ozaki
*Attorney, Agent, or Firm*—Robert F. Delbridge; Arne I. Fors; Frank I. Piper

[57] ABSTRACT

A process for recovering metallic cobalt from an aqueous ammoniacal solution containing dissolved cobalt and other metals as ammine sulphates with substantially all the dissolved cobalt being in cobaltic form. The process includes contacting the solution with a water immiscible liquid ion exchange reagent dissolved in an inert organic diluent to selectively substantially completely extract the other metals from the solution and produce an organic extractant loaded with the other metals and an aqueous cobalt bearing raffinate substantially free of the other metals. The cobalt bearing raffinate is separated from the loaded organic extractant and the loaded organic extractant is washed to remove substantially all ammonia therefrom. The other metals are stripped from the washed organic extractant which is then recycled to treat further solution. Cobalt is recovered from the raffinate.

9 Claims, 2 Drawing Figures

HYDROMETALLURGICAL PROCESS FOR THE PRODUCTION OF COBALT POWDER FROM MIXED METAL SULPHIDES

This invention relates to the production of metallic cobalt from mixed metal sulphides by hydrometallurgical processes.

Mixed metal sulphides are often available as by-products from various hydrometallurgical processes, such as precipitation of the remaining metals from the end solution obtained in the recovery of nickel from nickel diammine sulphate solution by hydrogen reduction or as by-products in the removal of cobalt from nickel ammine carbonate solutions as described in U.S. Pat. No. 3,716,618, for example. These mixed metal sulphides may typically contain major quantities of nickel and cobalt sulphides as well as varying amounts of zinc and copper sulphides and may also contain iron present in an oxidic or hydroxide form. They may also contain more sulphur than is required to satisfy the stoichiometric requirements for the formation of the simple metal sulphides. These mixed metal sulphides may take the form of damp filter cake or dried solids.

Various methods may currently be employed to recover cobalt from these mixed sulphides. One such method now in use commercially is the so-called soluble cobaltic ammine process, wherein the mixed metal sulphides are leached under pressure with sulphuric acid to extract the metal values into the solution, the solution is then treated with air at a pH of 5.1 to remove the dissolved iron as $Fe_2O_3$, and is then oxidized under pressure with air and ammonia to convert the divalent cobalt species to the cobaltic species, followed by the addition of sulphuric acid to precipitate the dissolved nickel as nickel ammonium sulphate, then conversion of the trivalent cobalt to the divalent stage by the addition of cobalt metal, and finally the treatment of the solution with hydrogen under pressure to produce metallic cobalt. This process is described in detail in U.S. Pat. Nos. 2,767,055 and 2,767,054. When copper is present, this process must be modified to remove copper separately as it is only partially precipitated with the nickel ammonium sulphate. One method of copper removal involves the treatment of the acidic leach solution with hydrogen sulphide to selectively precipitate copper as copper sulphide.

If, instead of acid leaching, ammoniacal leaching was used, the ammoniacal leaching of the mixed sulphides would have the advantage of replacing the acid leaching, iron removal and cobalt oxidation stages by a single stage, as iron does not remain in solution during leaching and, under the proper conditions, the cobalt can be completely oxidized to the trivalent state. However, the use of ammoniacal leaching in the soluble cobaltic ammine process has disadvantages in that selective copper removal becomes more difficult from ammoniacal solutions, and excessive quantities of cobalt hexammine sulphate are produced in addition to the desired cobaltic pentammine sulphate. This cobaltic hexammine sulphate tends to precipitate with the nickel ammonium sulphate and is thus not available for subsequent recovery as cobalt powder.

In accordance with the present invention, cobalt is recovered from an aqueous ammoniacal solution containing dissolved cobalt and other metals as ammine sulphates with substantially all the dissolved cobalt being in cobaltic form. The solution is contacted with a water immiscible liquid ion exchange reagent dissolved in an organic diluent to selectively substantially completely extract other metals from the solution, and produce an organic extractant loaded with the other metals and an aqueous cobalt bearing raffinate substantially free of other metals. The cobalt bearing raffinate is separated from the loaded organic extractant, and the loaded organic extractant is washed to remove substantially all ammonia therefrom, stripped of the other metals, and recycled to treat further solution.

The organic phase of the solvent extraction stage becomes loaded with nickel and copper, as mentioned above, and is subsequently stripped of the nickel and copper, for example by sulphuric acid, for subsequent re-use. According to an important feature of the invention, the loaded organic phase is washed, before stripping, to remove substantially all the ammonia therefrom and thereby prevent the formation of nickel ammonium sulphate in the stripping stage, which formation would render the stripping stage progressively more inefficient. The wash liquid may be distilled water or ammonium sulphate solution. After the washing of the loaded organic phase, the wash liquid with the ammonia removed from the loaded organic phase may be fed to the leaching stage.

Before washing the loaded organic phase to remove ammonia therefrom, the wash liquid may be used to wash the organic phase after stripping by removing acid and metal values travelling therewith. This prevents such acid and metal values being recycled to the solvent extraction stage and adversely affecting the quality of the raffinate which, in this process, contains the metal, namely cobalt, which is primarily intended to be recovered.

The subsequent passage of the wash liquid from the stripped organic phase to the loaded organic phase will result in nickel and copper in the wash liquid being transferred to the loaded organic phase, assuming that the loaded organic phase was previously loaded to less than maximum capacity. Where the wash liquid is subsequently fed to the leach stage, the cobalt therein as well as the ammonia rejoins the recovery process.

With the process according to the invention, acid leaching followed by treatment with ammonia and oxygen as described above may be used instead of ammoniacal leaching, it being required in both cases that the pregnant liquor be ammoniacal and that substantially all the cobalt be in cobaltic form to enable the solvent extraction stage to be carried out satisfactorily.

Figure 2:
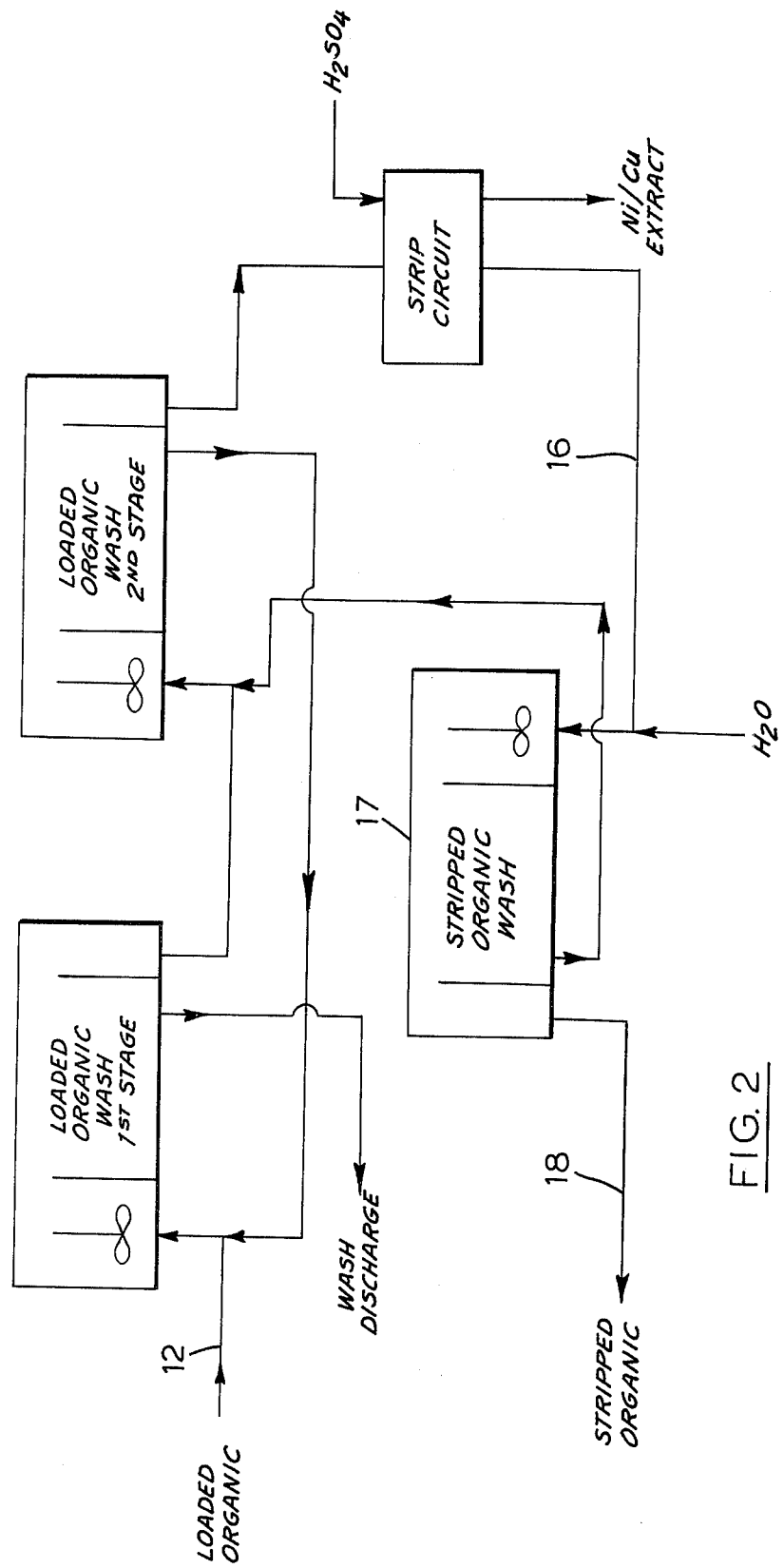

Embodiments of the invention will now be described, by way of example, with reference to the accompanying drawings of which:

FIG. 1 is a flow diagram of a cobalt recovery process utilizing a washing arrangement according to one embodiment; and FIG. 2 is a flow diagram showing an alternative washing arrangement.

Referring first to FIG. 1 of the accompanying drawings, the mixed sulphides 1 which may take the form of either a damp filter cake or dried solids are repulped in a repulp tank 2 with ammonia, ammonium sulphate and water along with recycled solids 3 and 4 and a wash stream 5, from other stages of the process. The amount of water added, either as process water or as water recycled from the wash, is adjusted to give the required concentration of solids in the repulped slurry, the solids concentration in the slurry being chosen to give the desired concentration of total metals in the leach solution.

The maximum desirable metals total is limited by the solubility limit of the metal salts at various stages in the process and must be chosen to avoid crystallization at critical places thereon. However, it is desirable to maintain a metals concentration sufficient to give easily workable solutions in the latter stages of the process. The most desirable range is a concentration of solids sufficient to give a leached solution containing 60–70 g/l of Ni + Co + Cu + Zn. The amount of ammonium sulphate added may be from 0–100 g/l of slurry or higher. However, poorer cobalt extraction will be observed unless there is sufficient ammonium sulphate to satisfy the anionic requirements for oxidation of the cobalt to the trivalent state.

When the mixed sulphide contains sulphur in excess of the stoichiometric requirements for simple metal sulphide formation, the excess sulphur will generate ammonium sulphate during the leach. It is preferable to use an ammonium sulphate addition of at least 10 g/l of slurry in order to ensure rapid and complete extraction of nickel, cobalt and copper. The amount of ammonia required varies considerably and is dependent upon the analysis of the mixed metal sulphide feed. Generally, sufficient ammonia should be added to form the nickel hexammine, cobalt pentammine, copper and zinc tetrammine complexes plus sufficient ammonia to form ammonium sulphate from any sulphur in excess of sulphide stoichiometric requirements. The ammonia may be added as anhydrous ammonia or as an aqueous solution. However, if higher metal concentrations are desired in the leach, anhydrous ammonia must be used to avoid excess dilution of the leach solution.

The slurry then undergoes an oxidizing leach in a pressure autoclave 6 with air or oxygen, where the sulphides are leached as the corresponding metal ammine complex. Iron is leached but rapidly precipitates as ferric hydroxide to give a solution which is essentially free of iron. A wide range of leach temperatures can be used, varying upwards from 65° C. Higher temperatures produce rapid and more complete extractions; however, more expensive pressure autoclaves are required. A temperature of approximately 105° C. is preferred. Either oxygen or air may be used as the oxygen supply to the leach. Oxygen partial pressures of 1–6 kg/cm$^2$ or higher may be used.

The slurry discharge from the leach must undergo some form of liquid/solids separation 7, such as filtration. If desired, the filter cake may be washed either in the filtration stage or separately by repulping and filtration, and the wash solution 9 is recycled to the repulp 2. The solids 8 may be discarded or transferred to other hydrometallurgical operations to recover the residual metal values therein.

The filtrate 10 is then treated with an organic oxime type extractant in a suitable organic hydrocarbon diluent to selectively extract the nickel and copper. The oxime type extractants are preferably certain substituted 2-hydroxybenzophenoximes which may also be used in admixture with certain α-hydroxy aliphatic oximes. Such substituted benzophenoximes and their preparation are described in U.S. Pat. No. 3,592,775 to Ronald R. Swanson which was issued July 13, 1971. They have the following general formula:

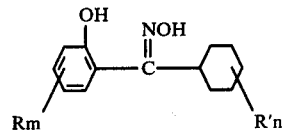

in which R and R' may be individually alike or different, and are saturated aliphatic groups, ethylenically unsaturated aliphatic groups or saturated or ethylenically unsaturated aliphatic ether groups, and $m$ and $n$ are 0, 1, 2, 3 or 4 with the proviso that $m$ and $n$ are not both 0. The total number of carbon atoms in R$m$ and R'$n$ may be from 3 to 25. A preferred substituted benzophenoxime is 2-hydroxy-5-nonyl-benzophenoxime.

Suitable α-hydroxyoximes and their preparation are described in U.S. Pat. No. 3,224,873 to Ronald R. Swanson which was issued Dec. 21, 1965. They have the following general formula:

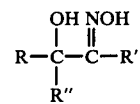

wherein R, R' and R" may be an organic hydrocarbon radical such as aliphatic or alkylaryl radical. R" may also be hydrogen. The preferred extractants are those wherein R and R' are the same and are unsaturated hydrocarbons or branch chain alkyl groups of from 6 – 20 carbon atoms and R" is hydrogen or is similar to R or R'. A preferred α-hydroxyoxime is 5, 8-diethyl-7-hydroxy-6-dodecanone oxime.

The oxime type extractants are employed preferably in the form of a solution in an organic solvent of aliphatic or aromatic hydrocarbon, such as kerosene, benzene, toluene and the like or other commercially available hydrocarbon diluent formulated specifically for this purpose. The amount of the α-oxime type extractant dissolved in the organic solvent can vary widely and is generally from about 2–40% by volume. A suitable extractant is produced by General Mills and identified as LIX64N.

The nickel and copper are extracted by contacting the feed solution 10 countercurrently with the organic extractant in several stages using contacting equipment common in the art, such as mixer settlers, pulse columns or the like. The extraction can be carried out over a wide range of temperatures, ranging from ambient temperature to temperatures approaching the flash point of the hydrocarbon diluent. Preferably the temperature is in the range of 40°–50° C. The extraction is carried out at the natural pH of the feed solution 10. The quantity of oxime type extractant to employ for the extraction depends upon the concentration of nickel and copper in the feed solution, and sufficient extractant is employed to achieve the desired extraction of the nickel and copper. It is preferred to employ slightly more organic extractant than would be required to completely load the nickel and copper, as this allows for more efficient removal of the nickel and copper and also provides reserve loading capacity for the removal of nickel and copper ions from the wash streams as will be described later.

Upon completion of a sufficient number of contact stages to achieve the desired extraction of nickel and copper, the oxime type extractant which is loaded or partially loaded with nickel and copper also contains some ammonia dissolved in the hydrocarbon diluent, as well as a small quantity of the aqueous phase in entrainment. It is undesirable that this ammonia be allowed to transfer to the acid strip stage of the process as the ammonium sulphate so formed will result in the precipitation of nickel ammonium sulphate crystals in the strip circuit. The loaded organic stream 12 is therefore washed by contacting it with a slightly acidic aqueous stream. The wash may be carried out in any commercially available contacting equipment such as a mixer settler or other apparatus available in the prior art. The wash may be carried out in one or more stages using water or dilute ammonium sulphate solution or a dilute acid solution and may also contain some dissolved nickel salts. The acid for neutralization may be already present in the wash solution or it may be added as a more concentrated solution as required by means of a pH controller. The pH of the wash stage should preferably be maintained between a pH range of 4.0 and 7.0 with the preferred value being approximately 5.5.

If desired, the loaded, washed organic extractant 13 containing complexed nickel and copper may be stored in a surge tank 14 until required for stripping. A retention time is therefore provided to allow for more complete disengagement of any aqueous phase entrained in the organic extractant. The disentrained aqueous phase settles to the bottom of the surge tank where it may periodically be withdrawn and recycled to an appropriate point in the process.

The loaded washed organic phase 15 can then be stripped by contacting it countercurrently in one or more stages with a sulphuric acid solution. The complexed copper and nickel is removed from the oxime type extractant and reports in the acidic solution as copper and nickel sulphate. The strength of acid required varies and depends upon the desired concentration of the stripped nickel and copper salts, upon the desired efficiency of stripping of the loaded metals, upon the number of strip stages employed, and upon the nature and relative abundance of the metals present in the loaded organic phase. For instance, if no copper was present in the initial mixed sulphide feed, much lower acid concentrations are required than if copper is also present. The organic to aqueous phase ratio must be chosen on the basis of the efficiency of stripping of the loaded metals to give the desired metal concentration in the aqueous extract. The aqueous extract from the strip stage may be a solution of nickel sulphate if no copper was present in the mixed sulphide feed, or it may be a mixture of nickel sulphate and copper sulphates if both copper and nickel were present in the initial feed material. If the quantity of copper present is sufficiently high that it is desired to have separate streams of nickel sulphate and copper sulphate, the strip stage may be modified by a more complicated arrangement of strip cells and close control of the amount and concentration of sulphuric acid used in the strip operation to permit selective stripping of the nickel and selective reloading of any copper stripped as described in the paper by C. R. Marigold and W. H. Jensen published in the proceedings of the International Solvent Extraction Conference, Lyon France, 1974, pages 1231 - 1262.

The stripped organic extractant 16 may contain small quantities of entrained aqueous extract. If this extract is allowed to transfer back to the extraction circuit, it may result in a lowering of the efficiency of extraction and produce a raffinate containing more than the desired quantities of nickel and copper. A wash stage 17 is therefore included to wash the stripped organic phase. The organic phase may be contacted with the aqueous wash phase by means of any suitable contactor available in the art, such as a mixer settler. The aqueous wash solution may be water or a dilute solution of ammonium sulphate. The washed stripped organic extractant 18 then returns to the solvent extraction section 11 where it once again loads nickel and copper from the aqueous feed.

An alternative wash circuit arrangement is shown in FIG. 2 in which the wash feed is contacted countercurrently with the organic stream first in one stage of stripped organic wash and thence to two stages of loaded organic wash. Nickel and copper salts washed from the stripped organic wash stage are thus transferred back to the second stage of the loaded organic wash. This second stage is maintained at a slightly acid pH of between 4.0 and 7.0 and preferably between the ranges of 5.5 and 6.0. Thus, any ammonia transferring to this wash stage is neutralized. Copper ions present in the wash solution are loaded into the partially loaded organic extractant, while most of the nickel remains in the aqueous wash solution. The aqueous wash solution then passes to the first stage of loaded organic wash, where most of the ammonia present in the loaded organic phase is washed out and leaves with the wash solution. The partially loaded extractant loads the dissolved nickel from the now ammoniacal wash solution. Any entrained cobalt salts will not load into the organic phase and will report with the wash solution. Most of the ammonia entrained in the loaded organic phase is also recovered and may be reused in the process. The wash solution may be recycled to the repulp tank 2 or to any other convenient location in the process.

Care must be taken during leaching to ensure the maximum oxidation of cobalt to the trivalent species, as the divalent cobaltous ion tends to load into the oxime type extractant. Once loaded, the cobalt is not readily removed by acid stripping and will tend to build up and block the loading sites in the extractant for nickel and copper, thus diminishing the loading capacity of the extractant. If significant quantities of divalent cobalt are present in the loaded organic, it may be necessary to incorporate a cobalt removal circuit. A portion of the organic extractant containing the loaded cobalt and preferably also loaded with nickel and copper is bled from the organic circuit. This organic bleed stream 19 is treated with hydrogen sulphide to precipitate the loaded metals as metal sulphides, which are then filtered off and recycled to the repulp tank stream 3 for releaching. After cobalt removal, the organic extractant stream 20 contains dissolved hydrogen sulphide which must be removed prior to returning the organic to the main organic circuit. The organic stream 20 is therefore contacted with a sodium bicarbonate wash stage 21 to remove the dissolved hydrogen sulphide.

The raffinate 22 from the nickel-copper solvent extraction 11 contains the unextracted constituents of the feed stream 10, including cobaltic pentammine and cobaltic hexammine sulphate, zinc tetrammine sulphate, ammonium sulphate and ammonium hydroxide, as well as small quantities of entrained organic extractant and other minor constituents.

The presence of small quantities of organic material in the raffinate may adversely affect subsequent stages in the process. Thus, precautions must be taken to minimize the transfer of organic material to subsequent stages in the raffinate. Most of the entrained organic extractant and hydrocarbon diluent separate from the aqueous raffinate by gravity if sufficient time is allowed. A settling tank 23 is provided to allow sufficient time for most of the entrained organic to separate and collect at the surface of the tank. Periodically, the organic extractant and diluent are skimmed from the top of the tank and returned to an appropriate point in the process.

Settling, however, may not remove all of the entrained organic material and additional removal facilities are provided in order to ensure a product of the required quality. The raffinate may be treated by one of several methods available in the art for the removal of trace organic material in step 24, including the use of an activated charcoal column or of one of several types of commercially available coalescers.

The raffinate contains substantial quantities of ammonia which may be recovered by distillation 25 and reused in the process. If desired, the cobalt concentration in solution may be increased at this stage by the removal of water during the distillation. If desired, the trace organic removal stage may be located after ammonia removal rather than prior thereto as shown in FIG. 1.

The cobalt contained in solution can now be treated to recover the cobalt as a metal product. The most advantageous method is by precipitation of the cobalt metal by means of hydrogen under pressure and elevated temperature as described by F. A. Schaufelberger in U.S. Pat. No. 2,734,821 issued Feb. 14, 1956. This process has an obvious advantage over electrolytic deposition, as electrolytic deposition of the metal is only possible in a neutral solution, which would require a technique to control the pH, such as precipitating the cobalt solution as the hydrate and electrolyzing the cobalt from a pulp of cobalt hydrate in suspension.

Hydrogen reduction to cobalt metal powder can best be accomplished from cobaltous solutions. Therefore, it is necessary to reduce the trivalent cobalt to the divalent. This can be achieved by contacting the cobalt in solution with metallic cobalt under controlled pH, where the ammonia liberated is neutralized by the addition of sulphuric acid. The techniques of reduction of the trivalent cobalt to the divalent species, and of the reduction of cobalt metal powder from cobaltic solutions, is well known in the prior art and is described in detail by V. N. Mackiw and T. W. Benz in "The Extracted Metallurgy of Copper, Nickel and Cobalt," edited by P. Quenau, Interscience Publishers, New York, 1961, pages 503–534.

Specific examples of various stages of the process will now be described. Examples of ammoniacal leaching and acid leaching are given.

EXAMPLE 1

A sample of damp nickel-cobalt-zinc mixed sulphides filter cake had the following composition (%): Ni — 15.7; Co — 27.3, Cu — 0.006, Fe — 0.038, Zn — 14.8, Mn — 0.001, $S_T$ — 32.7; S(SO$_4$) — 1.78, S° — 0.01, Insol — 3.15, and H$_2$O — 11.0 where $S_T$ is the total analysis of all forms of sulphur, S(SO$_4$) is the analysis for hexavalent sulphur combined to form the sulphate radical, and S° is elemental sulphur. For this mixed sulphide, the molar ratio of sulphur to the total of Ni + Co + Zn was 1.07/1. A sample of this mixed sulphide contains 445 g of solids on a dry basis was charged along with 250 g of ammonium sulphate and 290 g of ammonia added as reagent grade ammonium hydroxide, and sufficient water to form a total slurry volume of 2.5 liters into a 1 gallon capacity low pressure autoclave. The autoclave was equipped with a mechanical agitator, outside gas heating and a water cooling system. The agitator had a marine three blade type impeller at the bottom and a four blade paddle type impeller located 4 inches from the bottom. The speed of agitation was 800 rpm. The autoclave charge was leached for 3 hours at 80° C. under an oxygen partial pressure of 1.76 kg/cm$^2$ and resulted in a total autoclave gauge pressure of 5 kg/cm$^2$. The resulting leach solution had the following analysis (g/l): Ni — 26.5; Co$_T$ — 45.2, Co$^{++}$ — 0.1, Co$_{(hex)}$ — 17.4, Zn — 24.8, S — 82.8, and Mn — 0.001 where Co$_{(hex)}$ was the analysis of the cobalt present as cobalt hexammine sulphate. Extractions of 99.2, 99.0 and 95.3% were observed for nickel, cobalt and zinc, respectively.

EXAMPLE 2

A sample of unwashed nickel-cobalt-copper mixed metal sulphide filter cake had the following analysis:

|  | Ni | Co | Cu | Fe | S | NH$_{3F}$ | NH$_{3T}$ | CO$_2$ |
|---|---|---|---|---|---|---|---|---|
| solids (dry %) | 22.0 | 11.6 | 6.12 | 4.05 | 28.2 |  |  |  |
| liquor (g/l) | 14.1 | 0.153 | 0.001 |  |  | 68.0 | 73.7 | 67.5 | where NH$_{3F}$ was titratable ammonia and NH$_{3T}$ was the total ammonia as determined by the Kjeldahl method. Samples of this filter cake weighing 1550 g and containing 21.7% solids were leached in a 1 gallon titanium lined authclave for 2.5 hours at 104° C. In addition to the damp mixed metal sulphide filter cake, the charge also consisted of 312.5 g of ammonia added as reagent grade ammonium hydroxide, variable quantities of ammonium added as reagent grade ammonium hydroxide, variable quantities of ammonium sulphate as shown in Table I and sufficient water to make a total slurry volume of 2.5 liters. The oxygen partial pressure during the leach was variable and is also shown in Table 1. The metal extractions obtained are also shown in Table 1.

EXAMPLE 3

A portion of the damp nickel-cobalt-copper mixed metal sulphide described in Example 2 was tray dried overnight at 90° C. Several 200 g samples of this dried mixed metal sulphide were leached in an autoclave under 1.0 kg/cm$^2$ oxygen partial pressure for 2.5 hours. Ammonia and ammonium sulphate additions as well as the leach temperature were variable and are given in Table II. The total slurry volume was 2.5 liters. The metal extractions are also shown in Table II.

EXAMPLE 4

A 36.8 kg sample of the unwashed mixed metal sulphide filter cake described in Example 2, was charged into a 25 gallon stainless steel autoclave, equipped with a 7 inches diameter impeller which rotated at 900 rpm. To the mixed metal sulphide in the autoclave was also added 32.7 liters of ammonium hydroxide solution containing 220 g/l ammonia and 5.75 kg of ammonium sulphate. The charge was leached in this autoclave at 104° C. and 3.3 kg/cm$^2$ oxygen partial pressure for 2.5 hours. Extractions of 99.7%, 99.3% and 99.9% were obtained for nickel, cobalt and copper respectively.

EXAMPLE 5

A sample of leach solution obtained by the ammoniacal leaching of a nickel-cobalt-copper mixed metal sulphide had the following concentration (g/l): Ni — 39.8, Co — 27.4, Cu — 16.6, Fe — 0.004, Zn — 0.025, S — 80.4, Co$^{++}$ — 1.19, Co$_{(hex)}$ — 9.90, NH$_{3F}$ — 79.0 and NH$_{3T}$ — 135.2. The contacting equipment used in this specific example consisted of ten laboratory size mixer settler units with a mixing chamber volume of 200 ml and a settler volume of 400 ml. The mixers were equipped with 1 inch pumping impellers which provided interstage pumping in addition to mixing of the two phases. Copper and nickel were extracted from the aqueous feed solution by contacting it countercurrently with 4 stages of extraction in 25 v/o LIX64N (a commercially available mixture of 2-hydroxy-5-nonyl-benzophenoxime with a small quantity of 5,8-diethyl-7-hydroxy-6-dodecanone-oxime available from General Mills Chemical Corp.) and 75 v/o commercially available kerosene. The loaded organic was stripped by contacting it countercurrently in two stages using a feed of 250 g/l sulphuric acid. The loaded and stripped organic streams were each washed countercurrently in two stages of water wash. Distilled water was pumped countercurrently in two stripped organic wash cells to remove entrained acid from the stripped organic and was then fed countercurrently to the two loaded wash cells to remove dissolved and entrained ammonia from the loaded organic. Most of the ammonia present in the loaded organic was washed from the organic in the first stage of contact with the wash solution while the acid washed from the stripped organic wash circuit served to neutralize traces of ammonia which were not removed in the first stage of the loaded organic wash.

The feed rates were 100 ml/min organic, 12 ml/min aqueous feed, 18.6 ml/min acid strip feed, 18 ml/min water wash. Because of the high organic to aqueous phase ratios, it was necessary to incorporate an aqueous recycle in each mixer settler where a portion of the settled aqueous phase from the settler was recycled back to the mixer feed and in this manner a mixer phase ratio of approximately 1/1 was maintained.

The cell by cell aqueous and organic analysis are given in Table III. The raffinate contained approximately 0.05% of the feed nickel and less than 0.006% of the feed copper. The ratio of Ni + Cu to Co in the extract was 120/1.

EXAMPLE 6

A sample of ammoniacal solution obtained by acid leaching and ammonia oxidation of a nickel-cobalt-zinc mixed sulphides had the following analysis: Ni — 24.5, Co — 22.8, Co$^{++}$ — 0.041, Co$_{(hex)}$ — 9.47, Cu — 0.026, Mn — 0.136, S$_T$ — 63.2, NH$_{3F}$ — 70.0 and NH$_{3T}$ — 127.0. The organic-aqueous contactors were laboratory mixer settler units with a 600 ml mixer chamber and an 800 ml settler. Each mixer was equipped with a 1.5 inches pumping impeller. The extractant was 25 v/o LIX64N in "Napoleum 470" (Kerr McGee Corp). The cell arrangement was similar to that described in Example 5. The nickel was stripped from the loaded organic with 125 g/l sulphuric acid and in order to ensure better phase disengagement in the wash circuit, the wash feed was made from 20 g/l sulphuric acid neutralized to a pH of 7 with ammonia. The feed rates were 105 ml/min organic, 15.4 ml/min aqueous feed, 10 ml/min strip feed solution (125 g/l sulphuric acid) and 14.3 ml/min wash solution to feed. The results for a 6 hour period of continuous operation are shown in Table 4.

EXAMPLE 7

The same feed was used as in Example 6. The cell arrangement was modified to incorporate four stages of extraction, two stages of loaded organic wash, three strip stages and one stage of stripped organic wash. In order to ensure that ammonia did not transfer to the strip circuit in the loaded organic phase, the pH of the final stage of loaded organic wash was maintained in the range of 5.5 and 7.0 by the controlled addition of 125 g/l sulphuric acid to the mixer. Feed rates were 106 ml/min organic, 16 ml/min aqueous, 8.8 ml/min strip feed solution (125 g/l H$_2$SO$_4$) and 13.6 ml/min wash solution feed. The results for 22 hours of operation are shown in Table V.

EXAMPLE 8

Approximately 20 liters of a composite sample of raffinate from Examples 6 and 7 and other experiments was boiled to drive off most of the volatile free ammonia. The solution was then pumped through a column of 12 × 40 mesh activated carbon to remove the last trace of entrained organic material. The pH of the solution was then adjusted to 7.0 with sulphuric acid and the solution heated to 150° F. and 340 g of cobalt powder was added to convert the cobaltic species to the cobaltous species. Sulphuric acid was added to maintain a pH of 7.0 during the reaction. After 60 minutes, the solution was filtered to remove excess cobalt powder. The filtrate had the following analysis: Ni — 0.200, Co — 30.6, Cu — 0.0007, Fe — 0.0016, Mn — 0.018, Zn — 8.00, Co$^{++}$ — 30.6, NH$_{3F}$ — 17.8. The solution was treated with hydrogen under pressure to produce metallic cobalt powder. A charge of 2250 ml reduction feed solution was charged in a high pressure 1 gallon autoclave along with sufficient ammonium hydroxide to yield a free ammonia to cobalt molar ratio of 2.3, and 10.3 ml of 2.5% "Acrysol A-3" solution. Initially 200 g of wet fine cobalt powder (cobalt nucleation powder) was added. The content of the autoclave was heated to 121° C. and hydrogen was introduced to a partial pressure of 24.6 kg/cm$^2$. After 25 to 35 minutes when all hydrogen consumption had ceased, the autoclave was vented, discharged and the cobalt powder separated from the reduction end solution. The reduction end solution had a final pH of 7.35 to 7.50. A series of reductions or "densifications" was carried out wherein the cobalt powder from the previous densification was added back to the autoclave along with a fresh charge of reduction feed solution, ammonia and Acrysol A-3. After eight such densifications the bulk powder was washed and dried. Chemical analysis and physical characteristics of the cobalt powder are given in Table VI.

TABLE I $NH_3$-$(NH_4)_2SO_4$ Leach of Unwashed Mixed Sulphide Slurry
Feed material - unwashed mixed sulphide slurry #4.
Equipment - 1 gallon titanium lined autoclave

| Leach Time, Hours | Temp. °F | $O_2$ Pressure, psig | Charge, gm | $NH_3$ Addition, gpl | $(NH_4)_2SO_4$ Addition, gpl | Final Residue Analysis, % | | | | Extraction, %[1] | | | Final Residue Wt., gm |
|---|---|---|---|---|---|---|---|---|---|---|---|---|---|
| | | | | | | Ni | Co | Cu | Fe | Ni | Co | Cu | |
| 2.5 | 220 | 50 | 2000 | 125 | 100 | 4.51 | 25.9 | 0.700 | 17.5 | 96.5 | 50.9 | 97.5 | 87.0 |
| 2.5 | 220 | 50 | 1550 | 125 | 100 | 1.16 | 0.483 | 0.184 | 49.5 | 99.7[2] | 99.7[2] | 99.7[2] | 24.8 |
| 2.5 | 220 | 25 | 1550 | 125 | 0 | 2.21 | 1.54 | 0.384 | 44.4 | 99.1 | 98.8 | 99.4 | 29.1 |
| 2.5 | 220 | 25 | 1550 | 125 | 50 | 1.66 | 0.914 | 0.323 | 47.0 | 99.3 | 99.3 | 99.5 | 27.8 |
| 2.5 | 220 | 25 | 1550 | 125 | 170 | 1.84 | 0.766 | 0.445 | 48.2 | 99.3 | 99.4 | 99.4 | 28.5 |
| 2.5 | 220 | 25 | 1550 | 125 | 225 | 1.09 | 0.671 | 0.257 | 44.4 | 99.5 | 99.5 | 99.6 | 29.1 |
| 2.5 | 220 | 15 | 1550 | 125 | 100 | 1.47 | 0.754 | 0.271 | 48.4 | 99.4 | 99.5 | 99.6 | 26.1 |
| 2.5 | 220 | 15 | 1550 | 125 | 50 | 1.43 | 0.923 | 0.256 | 46.3 | 99.4 | 99.3 | 99.6 | 30.2 |

[1] Based on residue analysis unless otherwise noted.
[2] Based on product analyses.

TABLE II $NH_3$-$(NH_4)_2SO_4$ Leaching of Dried Mixed Sulphides
Charge: 200 gms dried unwashed mixed sulphide #4, $NH_3$ - variable, $(NH_4)_2SO_4$ - variable,
$H_2O$ to 2.5 liters.
Conditions: 15 psig $O_2$, 220° F unless otherwise noted, 2.5 hour leach time

| $NH_3$ Addition gpl | $(NH_4)_2SO_4$ Addition gpl | Final Residue Analysis, gpl | | | | Extraction, %* | | | Final Residue Wt., gm |
|---|---|---|---|---|---|---|---|---|---|
| | | Ni | Co | Cu | Fe | Ni | Co | Cu | |
| 100 | 100 | 8.83 | 3.25 | 0.611 | 37.0 | 95.6 | 96.9 | 98.9 | 39.5 |
| 125 | 100 | 4.96 | 2.03 | 0.520 | 38.7 | 97.6 | 98.1 | 99.1 | 36.3 |
| 150 | 100 | 4.77 | 1.21 | 0.526 | 43.3 | 98.0 | 99.0 | 99.2 | 32.1 |
| 125 | 100 | 5.38 | 1.78 | 0.540 | 42.9 | 97.7 | 98.5 | 99.2 | 32.2 |
| 125 | 0 | 14.9 | 4.00 | 0.506 | 25.8 | 89.3 | 94.5 | 98.7 | 57.2 |
| 125 | 50 | 8.82 | 2.46 | 0.528 | 37.4 | 95.6 | 97.7 | 99.0 | 37.9 |
| 125 | 75 | 8.58 | 1.99 | 0.490 | 39.0 | 95.9 | 98.2 | 99.2 | 34.5 |
| 125 | 125 | 4.38 | 1.33 | 0.870 | 44.6 | 98.2 | 99.0 | 98.7 | 31.0 |
| 125 | 100 | 3.26 | 1.32 | 0.558 | 46.4 | 98.7 | 99.0 | 99.2 | 29.6 |
| 125 | 100 | 4.49 | 2.30 | 0.795 | 41.4 | 98.0 | 97.7 | 98.4 | 37.3 |

*Based on residue analysis.
**Leach temperature = 150° F.
***Extreme drying conditions employed.

TABLE III

| | Concentration (gpl) | | | | | Co/Ni or Ni/Co | Remarks |
|---|---|---|---|---|---|---|---|
| | Ni | Co | Cu | $NH_3F$ | $H_2SO_{4F}$ | | |
| Aqueous | | | | | | | |
| Feed | 39.8 | 27.4 | 16.6 | | | .7 | |
| Extr. 1 | 16.3 | 27.6 | .08 | 47.2 | | 2 | |
| 2 | 4.28 | 27.1 | <.01 | 32.6 | | 6 | |
| 3 | .28 | 27.2 | <.01 | 22.4 | | 97 | |
| 4 | .06 | 26.2 | <.01 | 17.4 | | 437 | |
| Wash 1 | .598 | 5.02 | .0036 | 7.3 | | 8 | ⎫ loaded organic |
| 2 | 1.16 | .59 | .0056 | NIL | | 2 | ⎭ wash. |
| Wash 1 | 17.2 | .19 | 5.74 | 178 | | 90 | |
| 2 | 3.17 | .004 | .88 | 233 | | 792 | |
| Wash 1 | 1.13 | .002 | .0084 | 3.6 | | 565 | ⎫ stripped organic |
| 2 | .100 | .0012 | <.001 | NIL | | 83 | ⎭ |
| wash. | | | | | | | |
| Raffinate | .020 | 23.8 | <.001 | 10.5 | | 1190 | |
| Organic | | | | | | | |
| Feed | .008 | .002 | .052 | | | | |
| Extr. 1 | 4.04 | .027 | 1.44 | | | | |
| 2 | 3.36 | .027 | .084 | | | | |
| 3 | 1.78 | .030 | .062 | | | | |
| 4 | 1.00 | .031 | .058 | | | | |
| Wash 1 | 5.25 | .036 | 1.43 | | | | ⎫ Washed loaded |
| 2 | 4.50 | .028 | 1.41 | | | | ⎭ organic. |
| Strip 1 | .027 | .020 | .224 | | | | |
| 2 | .011 | .016 | .023 | | | | |
| Wash 1 | .0010 | .022 | .041 | | | | ⎫ Washed stripped |
| 2 | .008 | .024 | .041 | | | | ⎭ organic. |

| | $S_T$ | $NH_{3T}$ | $CO^{++}$ | $Co^{HEX}$ |
|---|---|---|---|---|
| *Additional | 79.1 | 97.5 | .328 | 16.9 |

TABLE III-continued

| | Concentration (gpl) | | | | Co/Ni or | |
|---|---|---|---|---|---|---|
| Ni | Co | Cu | $NH_3F$ | $H_2SO_{4F}$ | Ni/Co | Remarks |

Raffinate analyses.

TABLE IV

| | | Aqueous | | | | | | Organic | | | | | |
|---|---|---|---|---|---|---|---|---|---|---|---|---|---|
| | Hrs | 1 | 2 | 3 | 4 | 5 | 6 | 1 | 2 | 3 | 4 | 5 | 6 |
| E4 | Ni | 0.0030 | 0.0030 | 0.0030 | 0.0030 | 0.0030 | 0.0045 | | | | | | |
| E3 | (gpl) | | | | | | | | | | | | |
| E2 | | | | | | | | | | | | | |
| E1 | | | | | | | | 5.51 | 4.68 | 4.45 | 4.25 | 4.20 | 4.10 |
| LOW1 | | 0.0045 | 0.0030 | 0.0035 | 0.0040 | 0.0050 | 0.0055 | 5.72 | 4.57 | 4.45 | 4.25 | 4.20 | 4.10 |
| LOW2 | | | | | | | | 6.08 | 5.04 | 4.85 | 4.85 | 4.68 | 4.64 |
| S1 | | 34.6 | 42.4 | 43.6 | 40.4 | 41.2 | 43.6 | 1.43 | 1.33 | 1.31 | 1.00 | 0.888 | 0.917 |
| S2 | | | | | | | | 0.08 | 0.144 | 0.238 | 0.191 | 0.182 | 0.195 |
| SOW1 | | | | | | | | 0.036 | 0.054 | 0.102 | 0.150 | 0.166 | 0.191 |
| SOW2 | | | | | | | | 0.037 | 0.049 | 0.084 | 0.125 | 0.130 | 0.152 |
| LOW1 | Co | 0.034 | 0.100 | 0.151 | 0.142 | 0.191 | 0.180 | | | | | | |
| S1 | (gpl) | 0.138 | 0.164 | 0.191 | 0.204 | 0.238 | 0.281 | | | | | | |
| SOW2 | | | | | | | | 0.023 | 0.056 | 0.111 | 0.185 | 0.215 | 0.298 |
| E4 Co/Ni | | 7566 | 7566 | 7566 | 7566 | 7566 | 5044 | | | | | | |
| S1 Ni/Co | | 250 | 258 | 228 | 198 | 173 | 155 | | | | | | |

Raffinate Comp. = 22.7 gpl Co

TABLE V

(Part 1)

AQUEOUS

| Process Stage | Material | 2 | 4 | 6 | 8 | 10 | 12 | 14 | 16 | 18 | 20 | 22 |
|---|---|---|---|---|---|---|---|---|---|---|---|---|
| E4 | Ni | 0.0040 | 0.0034 | 0.0048 | 0.0032 | 0.0056 | 0.0042 | 0.0038 | 0.0040 | 0.0038 | 0.0052 | 0.0040 |
| E3 | (gpl) | 0.070 | 0.046 | 0.074 | 0.056 | 0.052 | 0.046 | 0.050 | — | 0.061 | 0.046 | 0.099 |
| E2 | | | | | | | | | | | | 0.975 |
| E1 | | | | | | | | | | | | 9.21 |
| LOW1 | | 0.018 | 0.021 | 0.038 | 0.013 | 0.027 | 0.045 | 0.033 | 0.035 | 0.029 | 0.026 | 0.037 |
| LOW2 | | | | | | | | | | | | 1.26 |
| S1 | | 55.0 | 53.9 | 52.4 | 51.6 | 51.7 | 51.8 | 50.4 | 52.3 | 51.6 | 49.3 | 45.6 |
| S2 | | | | | | | | | | | | 25.6 |
| S3 | | | | | | | | | | | | 4.26 |
| SOW | | | | | | | | | | | | 2.83 |
| LOW1 | Co | 0.373 | 0.438 | 0.382 | 0.378 | 0.500 | 0.380 | 0.329 | 0.363 | 0.362 | 0.306 | 0.316 |
| LOW2 | (gpl) | | | | | | | | | | | 0.245 |
| S1 | | 0.335 | | | | | 0.379 | | | | | 0.363 |
| S2 | | | | | | | | | | | | 0.128 |
| S3 | | | | | | | | | | | | 0.030 |
| SOW | | | | | | | | | | | | 0.019 |
| LOW | Zn | .258 | | | | | 0.294 | | | | | 0.228 |
| S1 | (gpl) | 0.695 | | | | | 0.519 | | | | | 0.559 |
| E4 | $NH_{3F}$ | 32.5 | | | | | 32.0 | | | | | 33.5 |
| E3 | (gpl) | N.S.S. | | | | | 44.5 | | | | | 43.3 |
| E2 | | | | | | | | | | | | 47.0 |
| E1 | | | | | | | | | | | | 56.0 |
| LOW1 | | 7.5 | | | | | 6.0 | | | | | 7.5 |
| S1 | Free | 17.7 | | | | | 24.2 | | | | | 33.7 |
| S2 | $H_2SO_4$ | | | | | | | | | | | 79.0 |
| S3 | (gpl) | | | | | | | | | | | 119.0 |
| SOW | | | | | | | | | | | | 2.4 |
| E4 | Co/Ni | 5500 | 6470 | 4583 | 6875 | 3928 | 5238 | 5790 | 5500 | 5790 | 4230 | 5500 |
| S1 | Ni/Co | 164 | | | | | 137 | | | | | 126 |

(Part 2)

ORGANIC

| Process Stage | Material | 2 | 4 | 6 | 8 | 10 | 12 | 14 | 16 | 18 | 20 | 22 |
|---|---|---|---|---|---|---|---|---|---|---|---|---|
| E4 | Ni | | | | | | | | | | | 0.176 |
| E3 | (gpl) | | | | | | | | | | | 0.362 |
| E2 | | | | | | | | | | | | 1.65 |
| E1 | | | | | | | | | | | | 4.65 |
| LOW1 | | | | | | | | | | | | 4.80 |
| LOW2 | | | | | | | | | | | | 5.00 |
| S1 | | | | | | | | | | | | 1.75 |
| S2 | | | | | | | | | | | | 0.180 |
| S3 | | | | | | | | | | | | 0.089 |
| SOW | | | 0.078 | | | | | 0.060 | | | | | 0.027 |
| SOW | Co | 0.560 | 0.570 | 0.610 | 0.600 | 0.600 | 0.616 | 0.620 | 0.630 | 0.620 | 0.630 | 0.636 |
| | Cu | 0.0025 | | | | | 0.0025 | | | | | 0.0015 |
| | Zn | 0.032 | | | | | 0.029 | | | | | 0.020 |
| | Mn | 0.0014 | | | | | 0.0002 | | | | | 0.0004 |

TABLE VI

Chemical Analyses of Cobalt Powders

TABLE VI-continued

|  | Co Plant Powder | D1 | D2 | D3 | D4 | D5 | D6 | D7 | D8 | D8 Reduced End Solution |
|---|---|---|---|---|---|---|---|---|---|---|
| Ni+Co+Cu |  |  |  |  |  |  |  |  | 99.5 |  |
| Ni | not available | 0.315 | 0.289 | 0.337 | 0.338 | 0.421 | 0.457 | 0.495 | 0.520 | 0.017 |
| Co |  |  |  |  |  |  |  |  |  | 4.36 |
| Cu |  |  |  |  |  |  |  |  | 0.065 |  |
| Fe |  |  |  |  |  |  |  |  | 0.0028 |  |
| S |  | 0.0208 | — | 0.0376 | 0.0320 | 0.0294 | 0.0270 | 0.0254 | 0.0276 | 98.0 |
| C |  | 0.146 | 0.175 | 0.171 | 0.171 | 0.179 | 0.171 | 0.168 | 0.179 |  |
| Mn |  |  |  |  |  |  |  |  | 0.0001 |  |
| Mg |  |  |  |  |  |  |  |  | 0.007 |  |
| Zn |  |  |  |  |  |  |  |  | 0.084 | 7.74 |
| $O_2$ |  |  |  |  |  |  |  |  | 0.319 |  |

| Physical Characteristics of Cobalt Powders |  |
|---|---|
|  | D8 Co Powder |
| Apparent Density | 3.07 |
| Fisher No. | 22.0 |
| +100 | 2.1 |
| −100 +150 | 9.3 |
| −150 +200 | 37.9 |
| −200 +250 | 10.7 |
| −250 +325 | 30.4 |
| −325 | 9.6 |

Various other embodiments and examples within the scope of the invention will be readily apparent to the man skilled in the art, the scope of the invention being defined in the appended claims.

What we claim as new and desire to protect by Letters Patent of the United States is:

1. A process for recovering metallic cobalt from mixed sulphide materials containing sulphides of cobalt and of at least one metal selected from the group consisting of nickel and copper, said process comprising leaching said mixed sulphide materials with an aqueous ammoniacal solution in the presence of oxygen to dissolve cobalt and said at least one metal as ammine sulphates and convert substantially all dissolved cobalt values to the cobaltic form, separating the resulting cobalt and said at least one metal bearing leach solution from undissolved residue and contacting said separated leach solution with a water immiscible liquid organic ion exchange reagent dissolved in an inert organic diluent to selectively substantially completely extract said at least one metal from said leach solution and produce an aqueous cobalt bearing raffinate substantially free of said at least one metal and an organic extractant phase loaded with said at least one metal, washing said loaded organic extractant phase to remove substantially all ammonia therefrom, contacting said loaded and washed organic extractant phase acid solution to strip said at least one metal therefrom, separating the resulting said at least one metal bearing aqueous acid solution from the resulting stripped organic extractant phase, washing said stripped organic extractant with a wash liquid to remove values of said at least one metal therefrom, using said wash liquid after said washing of said stripped organic extractant to effect said washing of said loaded organic extractant, recycling said stripped and washed organic extractant to treat additional leach solution for extraction of said at least one metal therefrom, treating said cobalt bearing raffinate to reduce substantially all cobaltic cobalt values to cobaltous form, and reacting the resultant cobaltous cobalt bearing solution with hydrogen at elevated temperature and pressure to precipitate dissolved cobalt in metallic powder form and recovering said cobalt powder from the reduced end solution.

2. A process according to claim 1 wherein said wash liquid is water.

3. A process according to claim 1 wherein said wash liquid is ammonium sulphate solution.

4. A process according to claim 1 wherein, after said washing liquid of said loaded organic extractent, said wash liquid is utilized in the leaching stage.

5. A process according to claim 1 wherein the leaching is carried out at a temperature of about 105° C. with an oxygen partial pressure of the order of 15 p.s.i.g., an ammonia addition of about 62.5 g/100g dry solids and an ammonium sulphate addition of about 100 g/l.

6. A process according to claim 1 wherein the liquid organic ion exchange reagent is an oxime type extractant.

7. A process according to claim 1 wherein divalent cobalt in the loaded organic extractant is removed by treatment with hydrogen sulphide.

8. A process according to claim 1 wherein ammonia is removed from the raffinate before reduction of the cobalt therein.

9. A process according to claim 1 wherein the cobalt in the raffinate is reduced to the cobaltous form by treatment with cobalt powder and a suitable acid.

* * * * *